(12) United States Patent
Bachmann et al.

(10) Patent No.: US 8,943,176 B2
(45) Date of Patent: Jan. 27, 2015

(54) SYSTEM AND METHOD FOR PUBLICATION OF DISTRIBUTED DATA PROCESSING SERVICE CHANGES

(75) Inventors: Hans Ruediger Bachmann, Heidelberg (DE); Vladislav Bezrukov, Sandhausen (DE); Timm Falter, Sinsheim (DE); Claus von Riegen, Wiesloch (DE); Alexander Zubev, Pazardjik (BG)

(73) Assignee: SAP SE, Walldorf (DE)

( * ) Notice: Subject to any disclaimer, the term of this patent is extended or adjusted under 35 U.S.C. 154(b) by 1471 days.

(21) Appl. No.: 11/751,566

(22) Filed: May 21, 2007

(65) Prior Publication Data

US 2008/0294757 A1    Nov. 27, 2008

(51) Int. Cl.
 G06F 15/177    (2006.01)
 G06F 15/16    (2006.01)
 H04L 29/08    (2006.01)
 H04L 12/24    (2006.01)
 G06F 9/54    (2006.01)

(52) U.S. Cl.
 CPC ............ *H04L 67/16* (2013.01); *H04L 41/0286* (2013.01); *H04L 41/0273* (2013.01); *G06F 9/542* (2013.01); *H04L 41/0233* (2013.01); *H04L 41/5061* (2013.01); *H04L 67/26* (2013.01); *H04L 67/02* (2013.01)
 USPC ............................. 709/221; 709/219; 709/202

(58) Field of Classification Search
CPC combination set(s) only.
See application file for complete search history.

(56) References Cited

U.S. PATENT DOCUMENTS

| | | | |
|---|---|---|---|
| 7,500,251 B2* | 3/2009 | Sugihara et al. | 719/318 |
| 7,689,430 B2* | 3/2010 | Fremantle et al. | 705/1.1 |
| 2002/0174117 A1* | 11/2002 | Nykanen | 707/4 |
| 2003/0208572 A1 | 11/2003 | Shah et al. | |
| 2004/0107196 A1 | 6/2004 | Chen et al. | |
| 2005/0015491 A1* | 1/2005 | Koeppel | 709/226 |
| 2005/0038771 A1 | 2/2005 | Sugihara et al. | |
| 2005/0080768 A1* | 4/2005 | Zhang et al. | 707/3 |
| 2005/0131912 A1 | 6/2005 | Lin et al. | |
| 2005/0152344 A1* | 7/2005 | Chiu et al. | 370/352 |
| 2007/0143501 A1* | 6/2007 | Pasha et al. | 709/246 |
| 2007/0162476 A1* | 7/2007 | McCollum | 707/101 |
| 2008/0281863 A1* | 11/2008 | Pospisil et al. | 707/103 R |

OTHER PUBLICATIONS

Non-Final Office Action for U.S. Appl. No. 11/643,413 Mailed Nov. 24, 2008, 15 pages.

* cited by examiner

*Primary Examiner* — Azizul Choudhury
(74) *Attorney, Agent, or Firm* — Schwegman Lundberg & Woessner, P.A.

(57) ABSTRACT

Methods and systems to improve change description information dissemination are described. When an altered version of a distributed data processing service is deployed, information about the altered service is published in a service information registry. The published information includes a link to a natural-language description of the altered service.

18 Claims, 6 Drawing Sheets

Example structure continued in Fig. 2B

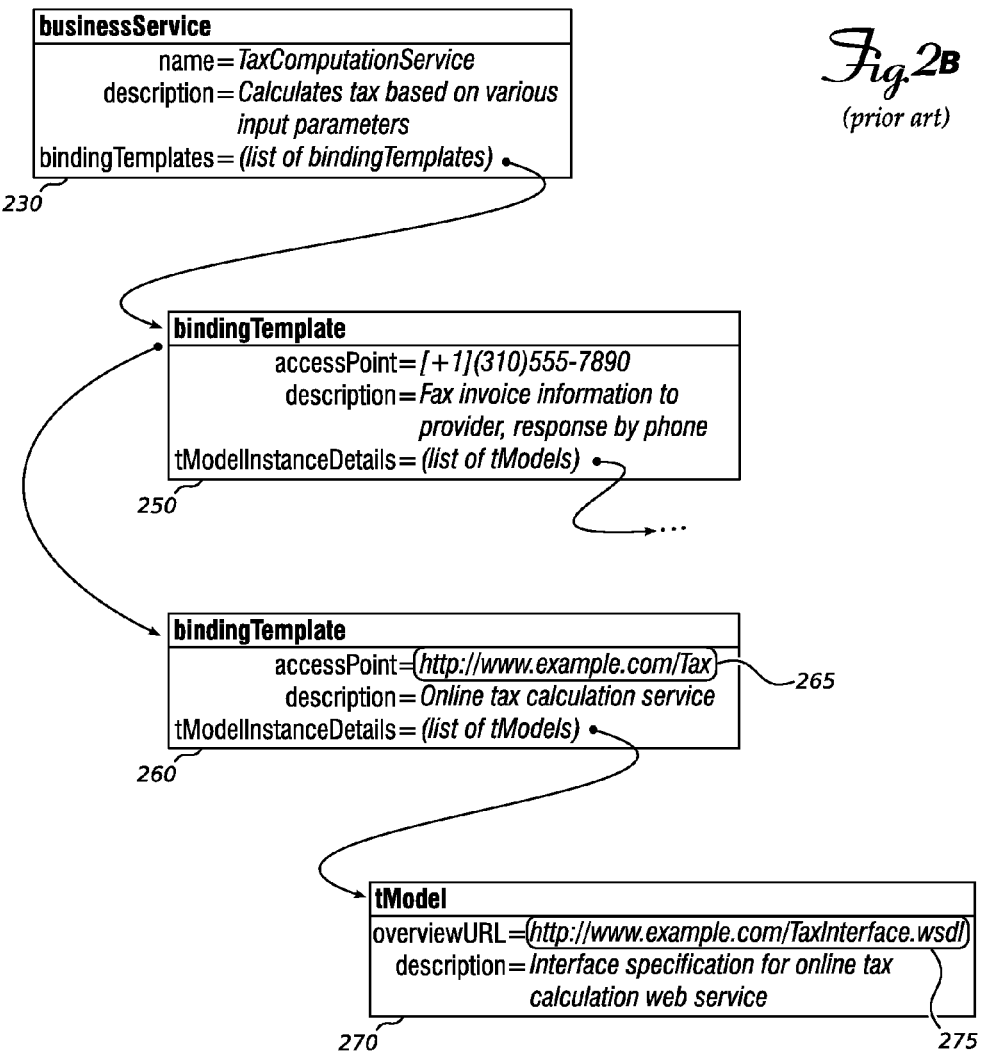
*Fig. 2B*
(prior art)
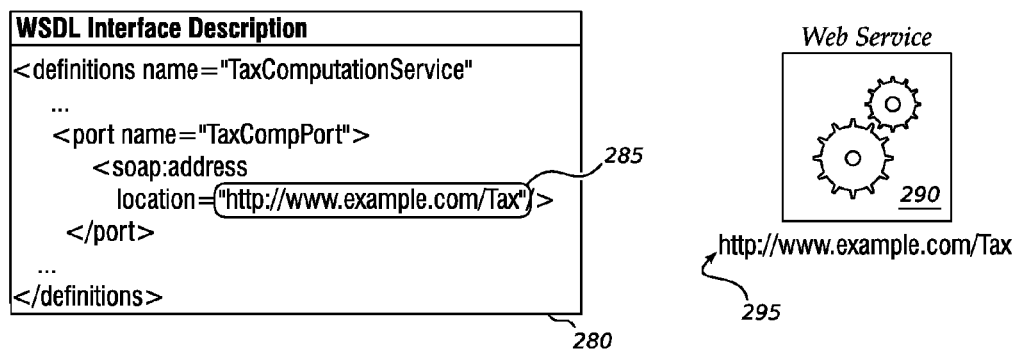

Fig. 3 tModel key = uuid:5DD52389-B1A4-4fe7-B131-0F8EF73DD175 ←—310 name = Service Change Notice ←—320 deleted = false ←—325 description = This is a sample tModel ←—330 overviewURL = http://www.example.com/interfaces/Upgrade-14-Feb-2007.html  340 categoryBag = {
    (keys of tModels with which this tModel is categorized)
    uuid:C1ACF26D-9672-4204-9C70-39B756F62A24  ←—360
}  ←—350

300 tModel key = uuid:C1ACF26D-9672-4204-9C70-39B756F62A24 ←—370 name = Change Description Document description = This tModel characterizes tModels that contain or represent information about business, service, and interface changes.

overviewURL = http://www.example.com/CDD/FAQ.html

380

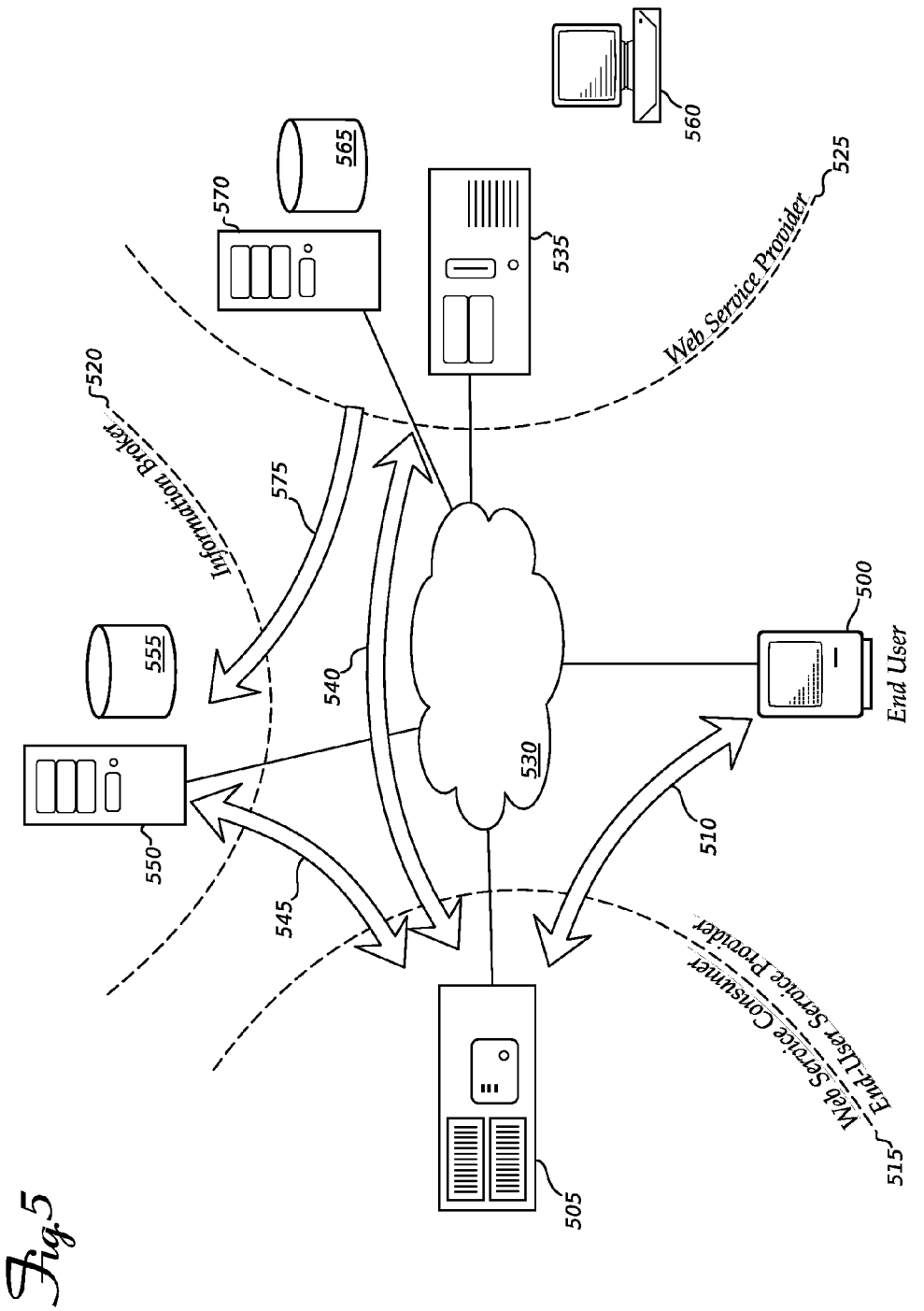

SYSTEM AND METHOD FOR PUBLICATION OF DISTRIBUTED DATA PROCESSING SERVICE CHANGES

FIELD

The invention relates to change management in distributed computing systems. More specifically, the invention relates to publishing information about changes to distributed data processing services.

BACKGROUND

Contemporary data processing activities are frequently distributed among a number of independent computer systems that use a communication fabric such as a local- or wide-area network to coordinate their operations. This model of data processing is generally more complex and somewhat less efficient than older arrangements where a complete, clearly-defined processing operation occurs at a single system and a "finished" data product may be transmitted to another location. In a distributed system, it is not uncommon for portions of closely-linked processing sequences to occur on different systems, with both partially-processed data and executable code passing between the systems over a communication link.

Various advantages are available from distributed processing. For example, computationally expensive or time-consuming operations can be consolidated and performed by a system designed specifically to perform those operations quickly; competing providers of standardized processing can establish a market to provide the services at a range of price/performance points; and decoupling phases of a processing sequence can make it easier to design robust systems that can continue operation despite failures of individual machines or communication links.

One difficulty that arises in designing and operating distributed data processing systems is in specifying the interfaces through which cooperating processing elements will communicate. Standards such as the Common Object Request Broker Architecture ("CORBA") by the Object Management Group ("OMG") consortium and the Web Services Description Language ("WSDL") by the international World Wide Web Consortium ("W3C") provide a great deal guidance in this area, but even assuming that all interoperational difficulties that are common to distributed systems could be addressed by the standards, individual distributed service clients and providers must agree even more closely on the methods and meanings of their interactions.

Computer programs and services have traditionally been identified by a numeric version number, and changes dealt with on an ad hoc basis. In one common usage, a two-part number describes the "major" and "minor" versions (e.g. version 2.6). A change in minor version number usually indicates that, while something has changed, the program or system can be expected to continue to work as it did in the past. A new major version number sometimes means that incompatibilities may be encountered. Version-number-based change management may be adequate for calling attention to the fact that a change has occurred, but in many environments, there is no standard mechanism for finding out more about the change. A user or system administrator may have no choice but to embark on a time-consuming search for further details, and there may be inadequate certainty that any details located represent the best and most-current information available. This approach has obvious drawbacks even when the number of services is small, and it quickly becomes untenable when applied to a larger number of services from a diverse group of providers. Alternate methods of obtaining information about changes to distributed data processing services may be of use in many environments.

SUMMARY

Embodiments of the invention permit a service provider to offer, and a service consumer to receive, detailed information about changes to an underlying distributed data processing service. A pointer to the detailed information is provided in a standardized location, so that a consumer can be assured of finding the latest, best-available information.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 2A and 2B show relationships between data structures in a Universal Description, Discovery and Integration ("UDDI") database.

FIG. 3 shows a sample set of data structures according to an embodiment of the invention.

FIG. 5 provides an overview of a complete system.

DETAILED DESCRIPTION

Providers of services used in distributed computer systems and applications have a keen interest in making their services appealing to clients. Services should be easy to integrate, reliable, and competitively priced, or clients will seek alternate providers. One thing a provider can do to help clients is to supply information about service changes that will affect the clients. From the service provider's perspective, the mechanism used to notify clients of changes is relatively unimportant; the service provider could equally easily post information on a web page, send email, or place the information in a database of service descriptions. Whichever method the provider chooses, it can reach all of its customers through the same channel.

From the perspective of a service consumer, however, the situation is significantly different. A distributed data processing system may combine dozens of services from as many different providers. If each provider chooses a different change notification mechanism, the consumer will be faced with a difficult task to keep abreast of notices and service bulletins from all the providers. Indeed, this difficulty may properly be considered part of the work of maintaining a distributed application, and may discourage the development of distributed applications because their maintenance is "more trouble than it's worth."

Embodiments of the invention propose using a standard, flexible and powerful mechanism to communicate service-related information such as change notifications from a service provider to the provider's clients. If many or all providers use the proposed mechanism, clients will benefit because the burden of maintaining a distributed application that relies on services from a number of providers will be reduced. This in turn benefits service providers, as clients are able to develop and deploy new and larger distributed applications.

Figure 1:
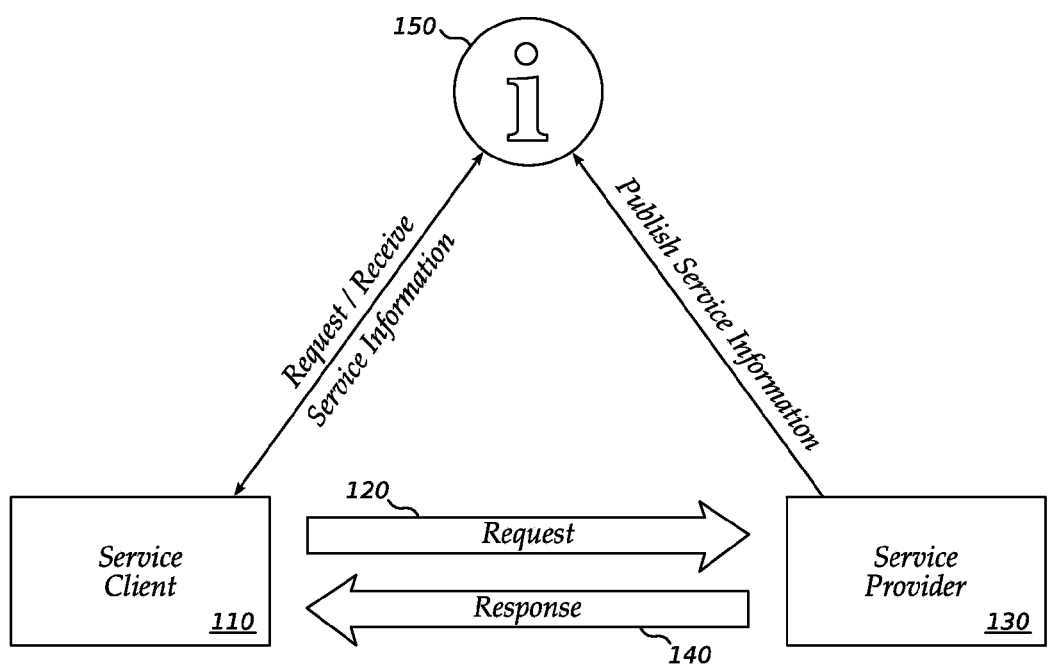
FIG. 1 shows a logical overview of an environment where embodiments of the invention may be used.

FIG. 1 shows a logical overview of an environment where a distributed data processing service can operate. The essential features of a distributed computation system are a service client 110, which transmits a request 120 to a service provider 130 and receives a response 140 in return. In some systems, including those that implement an embodiment of the invention, an information broker 150 may be used to make it easier for service client 110 to find a provider that offers the desired service and to discover the protocol that provider requires. The Universal Description, Discovery and Integration ("UDDI") specification prepared by the international Organization for the Advancement of Structured Information Standards ("OASIS") consortium describes one possible information broker architecture. Other environments may provide similar functionality (for example, CORBA provides an Object Request Broker or "ORB" to act as an information clearinghouse). In the following material, the specific example of a UDDI server will be considered.

Figure 2A:
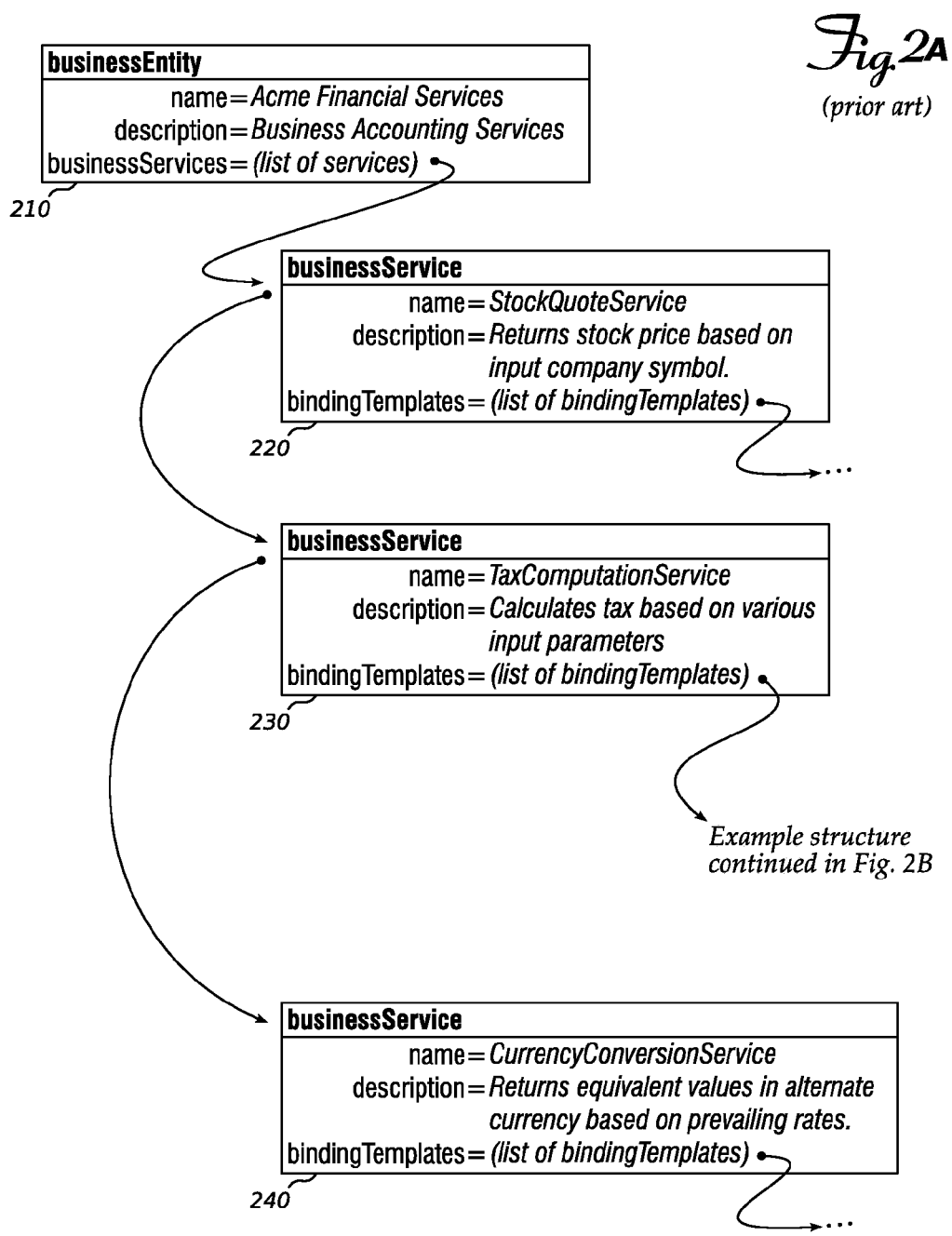

FIGS. 2A and 2B show some of the relationships between types of data in a UDDI registry. Beginning in FIG. 2A, a business entity record 210 may represent a company or other organization that offers one or more distributed data processing services (hereinafter "web services"). A UDDI server may permit a client to search for business entities by name or by other identifying information.

Business entity record 210 may be associated with several business service records 220, 230, 240. Business service records represent a service offered by the associated business entity 210. Services may be real-world functions such as a telephone help desk or a repair facility, or they may be web services such as the return of financial or weather information, or the calculation of a tax amount based on information about goods or services, the purchaser and seller, and the like.

FIG. 2B shows deeper levels of the UDDI data hierarchy. Beginning with business service record 230 (reproduced from FIG. 2A), binding template records 250 and 260 provide information about ways to access the business service. At the lowest level, a technical model ("tModel") structure 270 provides a link 275 to a Web Services Description Language ("WSDL") document 280 containing information a distributed application developer might need to access the business service described by UDDI business service record 230. For example, WSDL document 280 may contain a Uniform Resource Locator 285 that an application can use to communicate with web service 290, deployed at URL 295.

Those familiar with UDDI will recognize that some hierarchical details have been omitted. These details are not essential to an understanding of embodiments of the present invention, and would unnecessarily complicate the following discussion.

TModels like the one shown at FIG. 2B, element 270, are the workhorses of a UDDI system: they contain many types of data, and can even describe metadata (data about other data) in a very flexible way. FIG. 3 shows some elements of a tModel 300. At a minimum, a tModel contains a globally-unique key 310, a name 320, and a flag 325 to indicate whether the tModel has been logically deleted. Most tModels also include a short description 330 and a Uniform Resource Locator ("URL") 340 that refers to an external resource that may provide additional information. TModels can also refer to other tModels by including the other tModels's keys, for example within a set called a "categoryBag" 350 or "identifierBag" (not shown). TModel 300 can indicate, for example, that it describes or contains a certain type of information by adding a tModel key 360 for the type of information within its categoryBag 350. Key 360 matches the unique key 370 of tModel 380, so tModel 300 is understood to contain or relate to data of a type described by tModel 380, a Change Description Document.

A UDDI server provides facilities for locating tModels based on the tModel's key, its name, categorization, or other aspects. If a UDDI server's database contained the tModels shown in FIG. 3, a client could search for tModels characterized as Change Description Documents. Such tModels would, like tModel 300, include the unique key of tModel 380 in their categoryBag set. A client performing such a search would find tModel 300.

Figure 4:
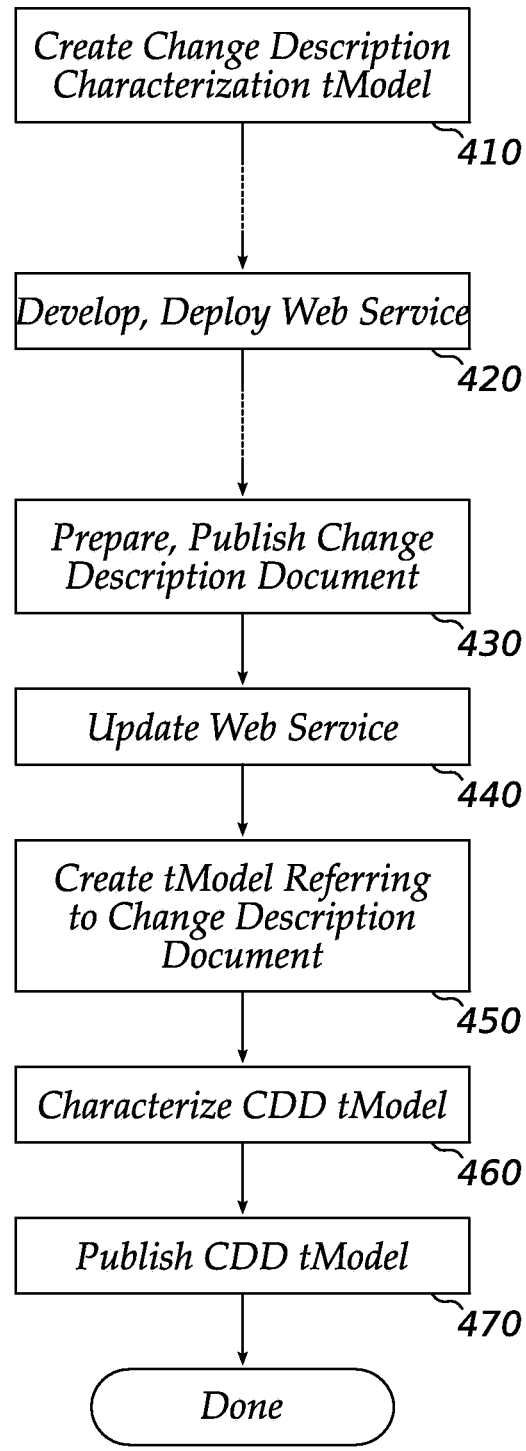
FIG. 4 is a flow chart showing how change documents may be published according to an embodiment of the invention.

FIG. 4 outlines a method for setting up and using a change description document categorization according to an embodiment of the invention. First, a Change Description Characterization tModel is created (410). This tModel will be used to characterize other tModels, and clients may search for tModels so characterized, so it is preferable for the Change Description Characterization tModel to be created by a standards organization or through another mechanism that encourages wide adoption of the tModel. Embodiments of the invention are most useful when clients and service providers agree on the tModel to be used for these purposes. Once the tModel has been created, the "create" operation 410 may generally be replaced with a "locate" operation that simply obtains the unique key of the previously-created tModel.

Next, a distributed data processing service provider develops and deploys a web service (420). The service may perform any function, and may be offered to any clients on any convenient terms; these details are unimportant to embodiments of the invention.

Later, if the service provider wishes to supplement, change, or discontinue the service, it may perform the following operations. A Change Description Document ("CDD") describing the planned change is prepared and published (430). For example, a Hypertext Markup Language ("HTML") document, a plain text document, or a Portable Document Format ("PDF") document may be created and made available through a Web server. The web service is updated (440) according to the plan. The service provider creates a tModel that refers to the Change Description Document (450) and characterizes the tModel (460) by adding the unique key of the Change Description Characterization tModel to the CDD's tModel's CategoryBag. Finally, the characterized CDD tModel is published (470). For example, the CDD tModel may be published into a UDDI server's database, where it can be found by clients performing searches. Some UDDI servers can be configured to transmit ("push") notification of newly-published CDD tModels to a list of subscribers.

Note that operations 430-470 can be re-ordered to satisfy business goals and obligations of the service provider. For example, the provider's clients may expect or be entitled to advance notice of any changes, before the changes are deployed. In that case, the service provider might publish the Change Description Document and the characterized tModel before updating the web service.

It is appreciated that a variety of types of changes may affect a web service. Not all types of changes may be of interest to all web service clients. For example, a service provider may change a service by increasing its price. Such a change would not require any technical response by an application developer, but a business specialist might wish to determine whether a corresponding price change was appropriate for the distributed application that incorporated the web service. Embodiments of the invention can accommodate different types of changes by creating a number of different Change Description Characterization tModels, each corresponding to a different sort of change. A basic Change Description Characterization tModel could be used to characterize any change, but additional Change Description Characterization tModels could be used to distinguish between the various sorts of changes. Thus, a tModel referring to a Change Description Document might have two or more Change Description Characterization keys in its CategoryBag set. Business managers might search for CDD tModels characterized as "price changes," while technical developers might search for CDD tModels characterized as "interface changes." Operational staff might be more concerned with CDD tModels announcing planned service interruptions.

A standard Change Description Characterization tModel, or a set of standard tModels for characterizing various sorts of changes, can serve as the basis for a framework for communication between web service providers and consumers regarding changes to the underlying services. If the standard tModels are widely adopted, web service consumers can more easily track changes affecting the services upon which a distributed application is built, and web service providers need only add the standard characterization tModels to the change description document tModels they publish.

In some embodiments, the Change Description Document ("CDD") prepared and published at 430 may be structured as an Extensible Markup Language ("XML") document to facilitate the automatic identification and/or extraction of portions of interest. Preferably, a CDD describes the changes to the entity to which it is attached. It may be a "delta" document, describing the changes from a previous version of the web service to a current version, or the changes between another selected version and the current version. If the previous (or selected) version was itself changed from an earlier version, the CDD may include a section (identified within the XML structure) to reference an earlier change document. The change document may include compatibility information in an automatically-processable format such as a change token, for example as described in co-pending application Ser. No. 11/541,352. Change description documents may alert reviewers to price changes or temporary service interruptions.

Some portions of an embodiment of the invention may be implemented by a web service administration tool. Such a tool may be constructed as a software and/or hardware system that interacts with an information broker such as a UDDI server. The administration tool may provide facilities to track web service interfaces, to compare different interface versions, and to publish change description documents to a resource server and corresponding tModels (appropriately characterized according to an embodiment of the invention) to the UDDI server. For example, when a new version of a distributed data processing service is deployed, the web service administration tool may locate the standard Change Description Characterization tModel in the UDDI records, create a new tModel categorized by the standard tModel, and attach the new tModel to the binding template for the service. The tool may also help an administrator to prepare a natural-language text document describing the change and arrange for the text document to be available from a web server. A command to cause the UDDI server to initiate "push" publishing, as mentioned above, may also be provided.

FIG. 5 shows how a number of computer systems can interact according to an embodiment of the invention. The principal objective of all the interactions shown is to complete a transaction between a computer system 500 representing an end user and a second system 505 (the transaction, which may include several separate interactions, is represented as arrow 510). System 505 represents and is administered by an entity that is both an end-user service provider and a web service consumer; the entity's administrative scope is indicated by dashed line 515.

Other entities that participate and support the principal transaction between end user 500 and end user service provider 515 include information broker 520 and web service provider 525. Communication between various pairs of these entities can occur over a distributed data communication network 530. The Internet is one such network, but one or more private networks can also be used to carry information between communication peers.

The service offered by end-user service provider 515 is a distributed data processing service that relies on a service provided by web service provider 525. For concreteness in the following description, the end-user to end-user-service-provider transaction will be assumed to be a purchase of goods, and the web service relied upon from web service provider 525 will be assumed to be the calculation of tax due on the purchase. It should be clear, however, that the interactions described can occur in any distributed data processing environment.

As system 505 processes the principal transaction, it may send a request to, and receive a response from, web service provider system 535. This interaction is represented as arrow 540. However, if web service provider 525 has changed the web service it offers, interaction 540 may fail. In this case, the principal transaction may also fail, or end user service provider 515 may obtain the necessary tax computation from a different provider. Now, an administrator at the web service consumer 515 may wish to investigate further.

This investigation can begin with a query 545 to system 550 at information broker 520. System 550 may be a Universal Description Discovery & Integration ("UDDI") server, maintaining information records in a database 555 as described previously. The web service consumer administrator may search for records associated with web service provider 525 by name, service type, or other parameters that are accepted by system 550. Of particular relevance to embodiments of the invention, the search may be configured to locate records that are characterized by a standard Change Description Characterization tModel. This search may return Change Description Document records previously published by an administrator at web service provider 525, as discussed next.

The distributed data processing service (web service) offered by web service provider 525 may be performed by a system 535. If the service is altered (as discussed previously: perhaps an error is corrected, a new feature is added, the price is changed, or the service will simply be unavailable during a system maintenance period), an administrator may use a web service administration tool at system 560 to prepare a change document and related data structures according to an embodiment of the invention. The change document may be a natural language text document that explains the changes to the web service, and it may be stored on mass storage device 565 and made accessible to the public through a resource server such as a web server running on system 570. The related data structures may include a Change Description Document tModel characterized by one or more standard Change Description Characterization tModels.

The web service provider administrator may publish the Change Description Document tModel to information broker 520 (this transaction is shown as arrow 575). The newly-published tModel provides a URL link to the natural language text document, and it is characterized as a Change Description Document structure so that it may be readily located by clients querying the information broker, such as (in this example) an administrator at web service consumer 515.

Returning to the web service consumer's actions, the administrator may receive the CDD tModel from information broker 520 and follow the link it contains to retrieve the change description document from web server 570. Upon reviewing the document, the administrator may be able to determine what actions must be taken at the web service consumer 515 so that it can successfully perform transactions with the web service provider 525.

Although several separate entities and computer systems are shown in FIG. 5, those of skill in the art will recognize that the functions described can be consolidated and performed by a smaller number of entities and/or systems, or separated into smaller units and distributed among an even greater number of cooperating units.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), and Electrically Erasable Programmable Read-Only Memory (EEPROM).

The applications of the present invention have been described largely by reference to specific examples and in terms of particular allocations of functionality to certain hardware and/or software components. However, those of skill in the art will recognize that change document management can also be performed by software and hardware that distribute the functions of embodiments of this invention differently than herein described. Such variations and implementations are understood to be captured according to the following claims.

We claim:

1. A method comprising:
   publishing information about an altered version of a network-accessible data processing service to a service information registry located on a server comprising a hardware server or a software server running on a hardware computation platform, the information to include a link to a change description document, wherein the change description document is to include a description of one or more planned changes to another version of the network-accessible data processing service that are to be implemented in the altered version of the data processing service, wherein the publishing comprises storing the information in a Universal Description Discovery & Integration ("UDDI") registry, and wherein the information includes a Technical Model ("tModel") that contains a Uniform Resource identifier ("URI") of the change description document; and
   deploying the altered version of the network-accessible data processing, service based on the one or inure planned changes.

2. The method of claim 1 wherein the network-accessible data processing service is a web service.

3. The method of claim 1, further comprising:
   transmitting a notification including a reference to the published information to a subscriber of the network accessible data processing service.

4. The method of claim 3, further comprising:
   receiving a query from the subscriber before transmitting the notification to the subscriber.

5. The method of claim 1 wherein the change description document is a first change description document, the method further comprising:
   providing a second link to a second change description document, the second link to be incorporated in the first change description document.

6. A non-transitory machine-readable medium containing instructions to cause a programmable processor to perform operations comprising:
   locating a first data structure associated with a change description document ("CDD") type, wherein a COD associated with the CDD type comprises a CDD that is to include a description of one or more planned changes to a version of a network-accessible data processing service that are to be implemented in an altered version of the data processing service;
   creating a second data structure categorized by the first data structure;
   storing the second data structure in a Universal Description Discovery & Integration ("UDDI") server, wherein the second data structure includes a Technical Model ("tModel") that contains a Uniform Resource identifier ("URI") of the CDD; and
   attaching the second data structure to a third data structure that is to describe a distributed data processing service interface.

7. The machine-readable medium of claim 6, containing additional instructions to cause the programmable processor to perform operations comprising:
   triggering a publishing action of an information broker.

8. The machine-readable medium of claim 7 wherein the information broker comprises the Universal Description Discovery and Integration ("UDDI") server.

9. The machine-readable medium of claim 6 wherein the first data structure is a tModel, and the third data structure is a binding template.

10. A system comprising:
    a network-accessible data processing service;
    a web server comprising a hardware server or a software server running on a hardware computation platform to respond to requests for resources, each resource to be identified by a Uniform Resource Identifier ("URI");
    a change description document that may be retrieved from the web server in response to as request for a change description document URI, wherein the change description document is to include a description of one or more planned changes to a version of a network-accessible data processing service that are to be implemented in an altered version of the data processing service; and
    publishing logic to transmit the change description document URI to a service information registry, wherein the publishing comprises storing information in a Universal Description Discovery & Integration ("UDDI") registry, and wherein the information includes a Technical Model ("tModel") that contains the change description document URI.

11. The system of claim 10, further comprising:
a service information registry to receive the change description document URI.

12. The system of claim 10 wherein the service information registry corresponds to the Universal Description Discovery & Integration ("UDDI") registry.

13. The system of claim 10 wherein the change description document is a natural-language text document.

14. The system of claim 10 wherein the network-accessible data processing service is a web service.

15. The system of claim 10 wherein the network-accessible data processing service comprises a tax calculation service.

16. An apparatus comprising:
a tool configured to prepare a change description document and a change description data structure, wherein the change description document is to include a description of one or more planned changes to a version of a network-accessible data processing service that are to be implemented in an altered version of the data processing service;
a resource server configured to publish the change description document, the resource server comprising a hardware server or a software server running on a hardware computation platform; and
a web server configured to publish the change description data structure to an information broker, wherein the publishing by the web server con rises storing, the chance description data structure in a Universal Description Discovery & Integration ("UDDI") server, and wherein the change description data structure includes a Technical Model ("tModel") that contains a Uniform Resource identifier ("URI") of the clangs; description document.

17. The apparatus of claim 16, wherein the apparatus transmits a notification about the change description data structure to a subscriber.

18. The apparatus of claim 16 wherein the resource server is a web server, and wherein the information broker comprises the Universal Description Discovery & Integration ("UDDI") server.

* * * * *